United States Patent [19]

Yonekubo

[11] Patent Number: 5,151,890
[45] Date of Patent: Sep. 29, 1992

[54] OPTICAL SYSTEM FOR OPTICAL MEMORY DEVICE

[75] Inventor: Masatoshi Yonekubo, Suwa, Japan

[73] Assignee: Seiko Epson Corporation, Tokyo, Japan

[21] Appl. No.: 842,729

[22] Filed: Feb. 26, 1992

Related U.S. Application Data

[63] Continuation of Ser. No. 520,515, May 8, 1990, abandoned.

[30] Foreign Application Priority Data

May 8, 1989 [JP] Japan .................. 1-114621
May 18, 1989 [JP] Japan .................. 1-124737
Jul. 28, 1989 [JP] Japan .................. 1-195846

[51] Int. Cl.$^5$ .............................................. G11B 7/09
[52] U.S. Cl. ............................. 369/44.110; 369/112; 369/44.14
[58] Field of Search ............ 369/44.11, 44.13, 44.14, 369/44.21, 44.22, 111, 112, 44.32

[56] References Cited

U.S. PATENT DOCUMENTS

| | | | |
|---|---|---|---|
| 4,125,859 | 11/1978 | Oshida et al. | 369/112 |
| 4,432,085 | 2/1984 | Reno et al. | 369/111 |
| 4,466,087 | 8/1984 | Cheng | 369/44.14 |
| 4,549,288 | 10/1985 | Chan | 369/54 |
| 4,823,334 | 4/1989 | Tanaka et al. | 369/112 |
| 4,959,824 | 9/1990 | Ueda et al. | 369/112 |
| 4,969,137 | 11/1990 | Sugiyama et al. | 369/112 |
| 5,052,767 | 10/1991 | Sugata et al. | 350/6.1 |

FOREIGN PATENT DOCUMENTS 146446 6/1987 Japan .

OTHER PUBLICATIONS

K. Koumura et al., vol. 1078, pp. 239–242 (1989).
K. Koumura et al., "High Speed Accessing Using Split Optical Head", Optical Data Storage Topical Meeting, SPIE, vol. 1078, pp. 239–242, 1989.

Primary Examiner—Roy N. Envall, Jr.
Assistant Examiner—Nakil Hindi
Attorney, Agent, or Firm—W. Douglas Carothers, Jr.

[57] ABSTRACT

An optical system for an optical memory device has a sectional optical system employing an objective lens and a polariscope, e.g., a deflecting system or a galvanomirror, which drives a reflecting mirror, to change the direction of the light beam for tracking purposes. An a focal optical system is included comprising a first optical system with a positive refracting power and positioned in the optical path between the objective lens and the polariscope and a second optical system with a positive refracting power and positioned between the first optical system and the objective lens whereby the maximum light beam shift or displacement, such as caused by moving components in the optical system, e.g., the beam deflecting system or galvanomirror or the linear access actuator, is substantially zero or kept to a minimum, for example, about 0.27 mm.

12 Claims, 7 Drawing Sheets

OPTICAL SYSTEM FOR OPTICAL MEMORY DEVICE

This is a continuation of copending application Ser. No. 07/520,515 filed May. 8, 1990, now abandoned.

BACKGROUND OF THE INVENTION

This invention relates generally to an optical system generally employed in an optical memory device for use in the field of optical storage and more particularly to an optical system that is sectionalized into a stationary optical system and a movable optical system for tracking and accessing an optical storage medium.

Optical systems for original optical memory devices of the prior art employed an integrated optical head containing an optical system, focus actuator and track actuator all on a single chassis and the movement of these components relative to the chassis for the purpose of providing memory storage tracking and data access. However, the access time was large because of inertia due to the mass of the components that had to be moved. In order to solve this problem, an optical system was provided which was sectionalized wherein the optical storage medium objective focusing lens, the reflecting mirror for the objective lens and focus actuator for the objective lens were provided in a movable optical portion for the optical storage medium access. The remaining components of the optical system, including a galvanomirror for tracking, where provided in a stationary optical portion so that the overall mass and resulting inertia relative to the movable optical portion were significantly reduced.

Figure 9:
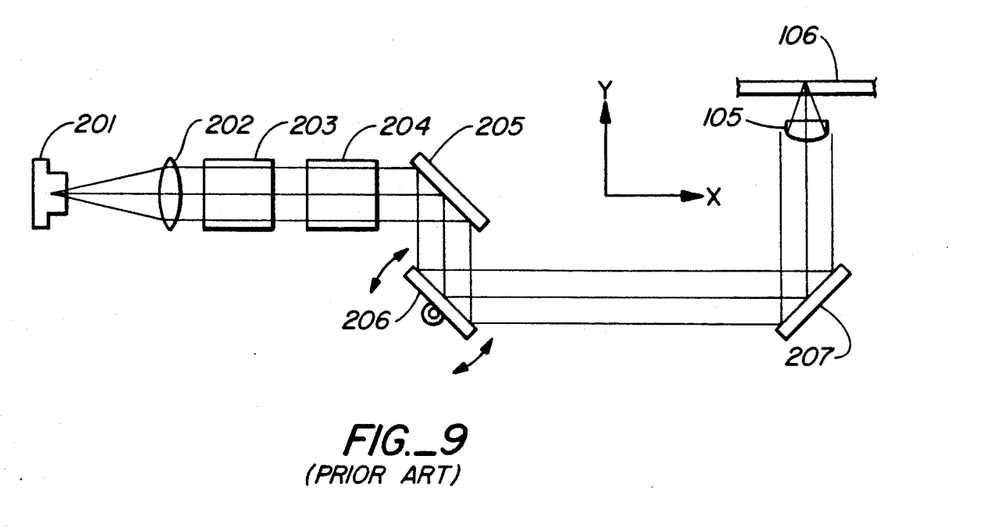
FIG. 9 is a side elevation of an optical system as known in the art.

FIG. 9 shows a side elevation of an optical system of this latter type known in the prior art. Light emitted from semiconductor laser 201 is collimated by objective lens 202 and passes through return beam detection prisms 203 and 204 after which the light path is redirected by reflecting mirror 205 to be incident on the reflecting mirror of galvanomirror 206. All of these foregoing components are part of the stationary optical portion. The light beam is then directed to the movable optical portion comprising reflecting mirror 207 wherein the light beam is redirected to pass through objective lens 105 for focus of the light beam onto a surface of optical storage medium 106. It is important to note that the axis of rotation of galvanomirror 206 is at right angles to the optical axis of the incident light beam on the mirror surface of galvanomirror 206.

Also, in the optical system illustrated in FIG. 9, the light path is divided into two vertical steps or levels in the Y direction relative to the plane of optical recording medium 105 so that the overall size of the optical memory device cannot be made thinner to provide for a more compact size.

Of particular concern is that the optical system of FIG. 9 has an inherent problem of shifting or displacement of the light beam incident on objective lens 105 upon rotation of galvanomirror 206. The adverse effects encountered due to this beam displacement are as follows:

There is a variation in the amount of light incident on objective lens 105 focusing the beam to optical recording medium 106 resulting in a degradation of the accuracy of the energy density on optical storage medium 106, which, in turn, results in write beam failure.

The variance in distribution of light incident on objective lens 105 also results in an unstable focused spot shape resulting in read beam failure.

The diameter of the collimated light beam must made large to prevent shading by objective lens 105. However, this lowers light utilization efficiency and makes it necessary to employ a higher power semiconductor laser 201.

Figure 10:
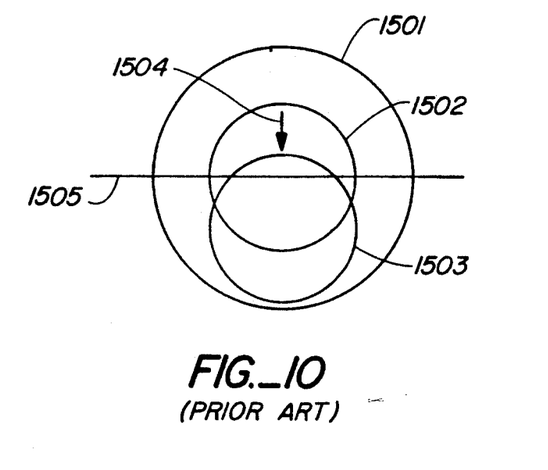
FIG. 10 is a cross section view of the incident and return light beam of the optical system shown in FIG. 9.

As evident from the cross sectional view of FIG. 10, the position of the return light beam from medium 106 moves with respect to emitted light beam 1501 from a position 1502 relative to its initial position when original incident on galvanomirror 206 to a position 1503 relative to the return beam incident on galvanomirror 206 resulting in the return light beam not being centered on the system servo signal detection sensor resulting in an inaccurate servo signal. This displacement becomes excessive when a track error detection method utilizing the so called push-pull technique is employed. This is because the direction of displacement 1504 of the light beam and partition line 1505 of a two-part sensor employed in the push-pull technique intersect at right angles.

Furthermore, in connection with these prior art systems requiring three reflecting mirrors, the phase difference in the polarized light must be controlled relative to all three reflecting surfaces, particularly in the case of magneto-optical type of recording. Correction of phase differences requires precise control of the formation of multilayer dielectric films deposited on the mirror surfaces. Even in the case where these multilayer dielectric films are carefully formed and their parameters are controlled, the tolerance in the phase difference in the polarized light between reflecting mirrors is realistically about ±5 degrees. Therefore, considering a worst case situation comprising a phase difference of ±15 degrees relative to the employment of three reflecting mirrors thereby requiring phase control relative to detection prism 204 and an allowable overall polarizing phase difference of approximately ±10 degrees, mass production and high yields of such optical systems is extremely difficult to achieve.

Figure 11A:
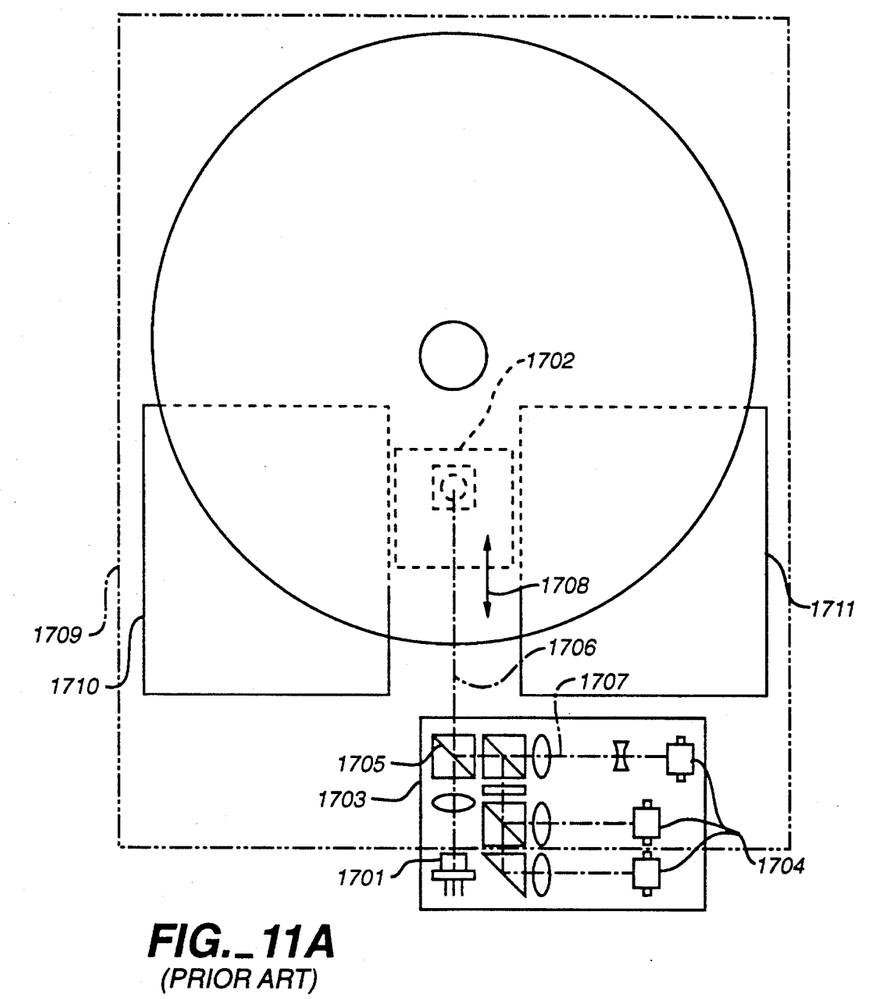
FIGS. 11A and 11B are respectively a plan view and a side elevation of another optical system employed in an optical memory device known in the prior art.
Figure 11B:
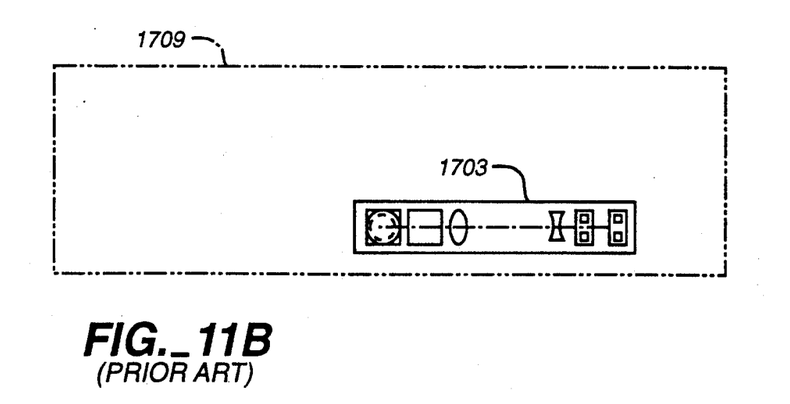

FIG. 11 shows further example of a prior art optical system for an optical memory device contained in a standardized size housing 1709. In the case here, the access direction 1708 of movable optical system 1702 is parallel to the plane containing the optical axis of incident light 1706 emitted from semiconductor laser 1701 in stationary optical system 1703. Beam splitter 1705 is positioned in the optical path between light source 1701 and movable optical system 1702 to direct return light beam 1707 from movable optical system 1702 into signal detection optical system 1704, which also comprises a portion of stationary optical system 1703. The overall size of the optical memory device employing standard disc size diameters of 130 mm and 90 mm renders the structure too large, particularly in the horizontal plane of FIG. 11A wherein the rear optics over extend the preferred standardized housing boundary. Furthermore, attempting to fit this structure in a half-height size housing reduces the space available for operation of linear access motors 1710 and 1711 which results in longer access times.

It is an object of this invention to solve the foregoing problems.

It is another object of this invention to provide an optical system for an optical memory device capable of being employed in conventional size memory devices with smaller heights while providing high access speed capabilities.

It is a further object of this invention to effectively eliminate the necessity of controlling the phase differences between polarized light reflected from a plurality of reflecting mirrors employed in an optical system.

It is a further object of this invention to provide an optical system for an optical memory device wherein the amount of displacement between the incident light beam and the return light beam in an optical system brought about by the rotation of a galvanomirror employed in the system is reduced.

It is still a further object of this invention to provide an optical memory device that can be made compact.

SUMMARY OF THE INVENTION

According to this invention, an optical system for an optical memory device has a sectional optical system employing an objective lens and a deflecting system to change the direction of a light beam, e.g., a deflecting system or a galvanomirror, which drives a reflecting mirror, to change the direction of the light beam for tracking purposes. An a focal optical system is included comprising a first optical system with a positive refracting power and positioned in the optical path between the objective lens and the polariscope and a second optical system with a positive refracting power and positioned between the first optical system and the objective lens whereby the maximum light beam shift or displacement, such as caused by moving components in the optical system, e.g., the beam deflecting system or galvanomirror or the linear access actuator, is substantially zero or kept to a minimum, for example, about 0.27 mm. This is actually only 1/5.3 mm since such a displacement is only 8 percent of the objective lens pupil diameter so that the amount of light beam displacement at the center access position is reduced to about zero.

In contrast to the foregoing, when a light spot is moved 50 $\mu$m in an optical system of the prior art, the light beam may move a maximum of 1.43 mm at the objective lens position. This is 43.3 percent of the pupil diameter of the objective lens which is not at all acceptable.

Also, the angle of rotation of the galvanomirror is reduced 11% by making the focal length, $f_1$, of the first optical system longer than the focal length, $f_2$, of the second optical system so the convergence ratio is approximately 1.12. This is particularly effective with respect to the design of a galvanomirror in an optical system wherein the optical storage medium is rotated at high speed.

Further, by employing the optical system of this invention, the problems of fluctuating energy density on the optical storage medium, fluctuation in the shape of the convergence spot, decreased light utilization efficiency and degradation of the focus servo signal prevalent in the prior art may be alleviated.

In addition, degradation of the track error signal when employing the push-pull technique, which is a serious problem in the prior art, can be resolved in the provision of a good detected signal wherein correction is achieved employing a different rotational axis for the galvanomirror or by means of conventional compensation means for compensating the tracking error offset.

The optical system of this invention employs a point light source, a collimator lens, an objective lens, a first reflecting mirror which redirects the light beam in a direction of the optical axis to the objective lens for focus onto an optical storage medium, a focus actuator which moves the objective lens along the optical axis for focusing, a second reflecting mirror which functions as a galvanomirror for tracking and an access mechanism which linearly moves the objective lens, the first reflecting mirror and the focus actuator in a direction at right angles to the track surface of the optical storage medium. The axis of rotation of the galvanomirror is constructed to be parallel to the optical axis of the light beam incident on the galvanomirror from the direction of the point light source and at right angles to the access direction of the access mechanism whereby the resultant optical path can be made one vertical step or level, vis a vis two vertical steps in the prior art, resulting in a reduced vertical height for an optical memory device.

In connection with the foregoing, the first and second reflecting mirrors may be comprised of total reflection prisms. Also, the total number of reflecting mirrors is reduced by one over comparable optical systems so that phase differences in the polarized light generated at each of two reflecting mirrors are effectively cancelled thereby eliminating the need for the utilization of and precise control in the formation of multilayer dielectric films on these two mirror surfaces.

In another embodiment of the optical system of this invention, the system is sectionalized to provide a stationary optical system including a light source and a movable optical system including an objective lens for focusing to an optical storage medium wherein only the movable optical system is linearly moved to perform the track accessing operation relative to the optical storage medium. The stationary optical system has at least one beam splitter positioned in the optical path of the light beam between the light source and the movable optical system to direct the initial beam and redirect the returning light beam from the movable optical system into a signal detection optical system in the stationary optical system having an optical path or paths in a vertical plane at right angles to the horizontal plane containing the optical path between the stationary and movable optical systems, i.e., the direction of linear access of the movable optical system wherein, in the optical system of the prior art which could only be expanded in the horizontal plane, can be expanded in the vertical plane. Thus, the space employed by linear motors and other components is not restrained thereby making it possible to fit the optical memory device in a standardized size for such drive units while permitting the employment of sufficiently large linear motors capable of providing high speed access of the optical storage medium.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
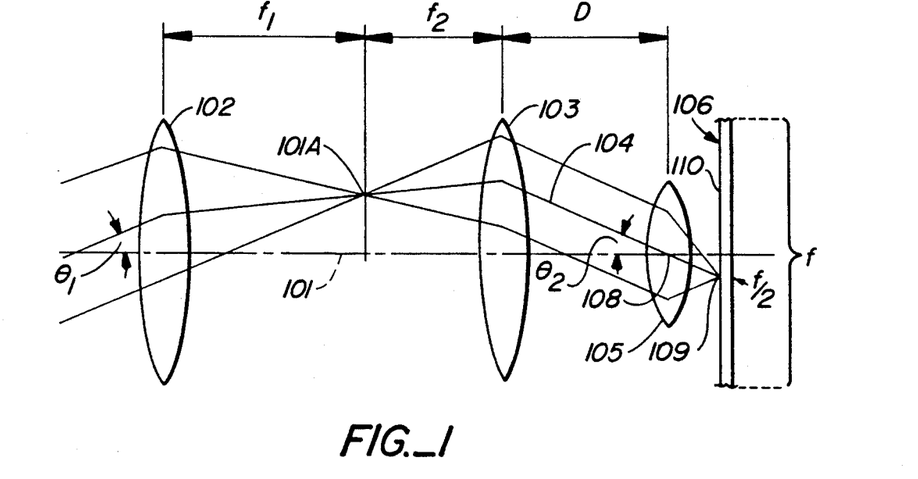
FIG. 1 illustrates the inventive principle of the optical system of this invention.

As shown in FIG. 1, the light beam from a point source, that has been collimated and redirected via a deflecting system to change the direction of the light beam, enters a first optical system 102 at angle $\theta_1$ with respect to optical axis 101 and converges to a point 101A at focal length $f_1$ of first optical system 102 and then diverges from point 101A to a second optical system 103 positioned at focal length $f_2$ from focal point 101A. The light beam from the second optical system is thereafter focused onto optical storage medium 106 by means of objective lens 105 The optical system comprising first optical system 102 and second optical system 103 separated by the distance $f_1 + f_2$ is the afocal optical system of this invention.

The angle $\theta_2$ at which the beam is emitted from second optical system 103 is provided by the formula:

$$\theta_2 = \theta_1 \cdot (f_1/f_2).$$

By positioning objective lens 105 at a distance D from second optical system 103 wherein primary light beam 104 will cross optical axis 101 at point 108 with the resultant focused spot 109 of beam 104 positioned at the center of access area 110 of the recording region, f, of medium 106, i.e., at f/2, then any significant shift or displacement between light beam 104 and the return beam will not occur when objective lens 105 is moved by a linear access actuator for accessing data from medium 106. Since objective lens 105 in this system will move with the movable portion of an optical head during access of optical storage medium 106, light beam displacement caused by such movement, as previously illustrated relative to FIG. 10, can be minimized by employing an optical design wherein the position of linear access movement of objective lens 105 is a distance D from second optical system 103, as illustrated in FIG. 1, when light beam 104 passes through the optical center point 108 of lens 105 with light spot 109 positioned at center f/2.

In actual practice, the maximum light beam displacement is kept to about 0.27, which is actually only 1/5.3 mm since such a displacement is only 8 percent of the pupil diameter of objective lens 105 so that the amount of light beam displacement at the center access position 108 is reduced to about zero.

EMBODIMENT 1

Figure 2:
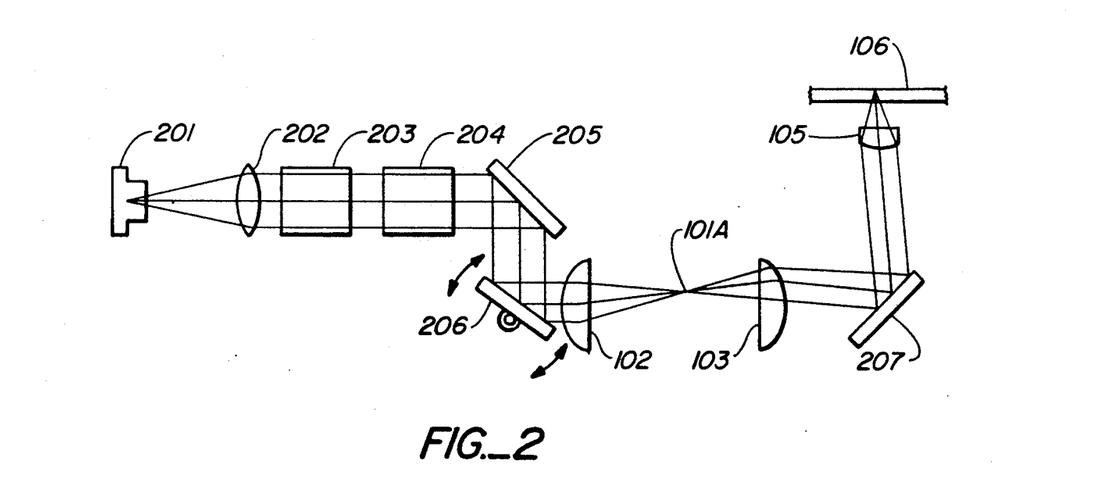
FIG. 2 is a side elevation of a first embodiment of an optical system of this invention.

Reference is now made to FIG. 2 which is a side elevation a first embodiment of this invention as applied, for example, to a 5.25-inch magneto-optic disc drive memory device, although this invention can be easily applied to a 3.5-inch optical disc drive memory system.

The light beam from semiconductor laser 201 is collimated by objective lens 202 and thereafter passes through servo signal separation prism 203 and magneto-optic signal separation prism 204. The light path is then redirected by reflecting mirror 205 onto reflecting mirror 206, which is a galvanomirror where it is redirected by mirror 206 in a direction substantially parallel to the direction of linear access movement. At this point, the light beam is handled by the afocal optical system of this invention wherein the beam is converged to point 101A by first optical system 102 and is then collimated again by second optical system 103. The light beam is then directed to objective lens 105 by reflecting mirror 207 which focuses the light beam to a spot onto optical storage medium 106. It should be noted that the direction of rotation of galvanomirror 206 is opposite to that in the prior art optical system in FIG. 9 because the afocal optical system comprising lenses 102 and 103 inverts the image. Furthermore, the light beam reflected from mirror 206 is directed obliquely upward by first optical system 102 and then is directed obliquely downward by second optical system 103.

An example of actual operating parameters of this embodiment are as follows:

1. Focal length, $f_1$, of first optical system 102: 17.3 mm
2. Focal length, $f_2$, of second optical system 102: 15.3 mm
3. Focal length of objective lens 105: 3 mm
4. Numerical aperture of objective lens: 0.55
5. Distance between galvanomirror 206 and first optical system 102: 4 mm
6. Distance between first optical system 102 and second optical system 103: 32.7 mm
7. Distance from second optical system 103 to objective lens 105 at the position of linear access movement: 33 mm
8. Access area, 110: 32 mm
9. Diameter of the reflected light beam incident on the afocal optical system: 5 mm
10. Diameter of the light beam from the afocal optical system: 4.45 mm The parameters when the light spot is moved 50 μm on the optical storage medium are as follows:

1. Angle of rotation of galvanomirror 206: 0.42 degree
2. Angle of incidence on the afocal optical system: 0.85 degree
3. Angle of emission from the afocal optical system: 0.95 degree Further, by employing achromatic lenses for first optical system 102 and second optical system 103, fluctuations in the operating wavelength of a semiconductor laser light source can be accommodated. Also, it is possible to reduce the amount of rotation at galvanomirror 206 by significantly increasing the focal length difference between first optical system 102 and second optical system 103, i.e., $f_1 > f_2$.

It is also possible to reduce costs of the optical system of this invention by making the focal lengths of first optical system system 102 and second optical system 103 equal ($f_1 = f_2$) so that these same lens components can be employed in the afocal optical system. However, the angle of rotation of the galvanomirror is reduced by 11% by making the focal length of the first optical system longer than the focal length of the second optical system so the convergence ratio is approximately 1.12. This is particularly effective with respect to the design of a galvanomirror in an optical system wherein the optical storage medium is rotated at high operational speed.

Figure 3:
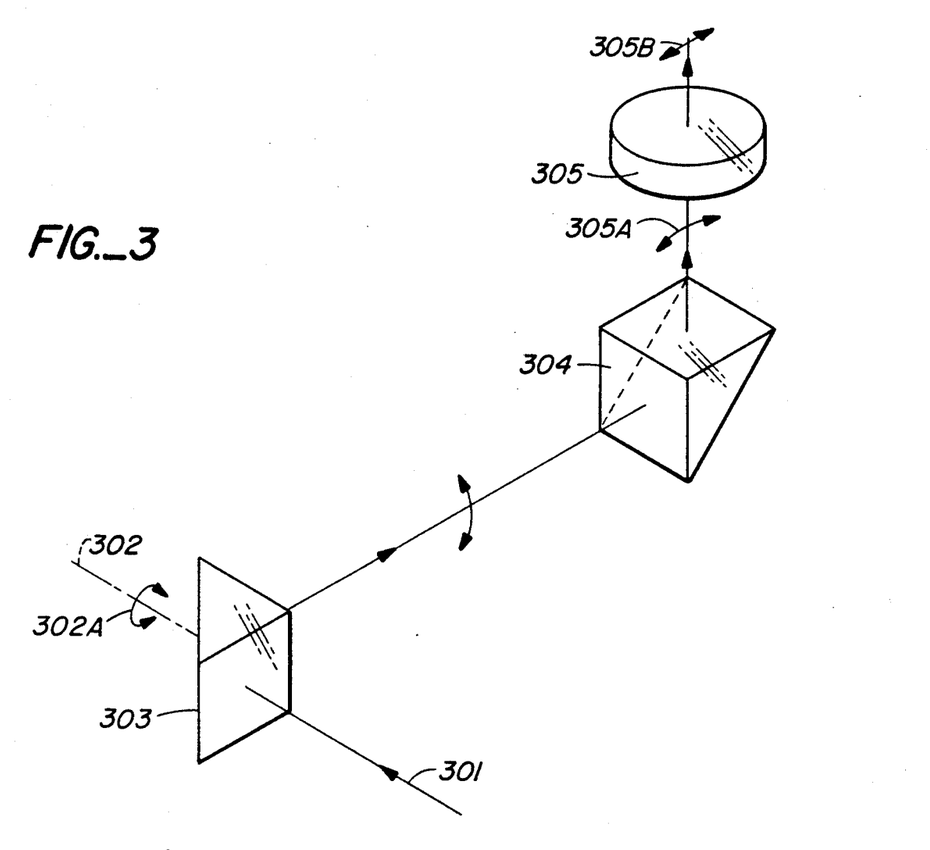
FIG. 3 is an alternate form for the reflecting mirrors in the first embodiment of the optical system of this invention, which is also employed in the third embodiment.

Reference is now made to FIG. 3 wherein there is shown an alternative optical means for utilization with the embodiment shown in FIG. 2 wherein the polarization phase difference is reduced to a significant degree by placing the axis of rotation of the galvanomirror parallel to the optical path or axis of the light beam rather than perpendicular to the optical axis of the light beam. Further, this alternative approach, total reflecting prisms are employed instead of surface mirrors. As shown in FIG. 3, light beam 301 from the direction of a point light source enters a second reflecting mirror 303, which is a galvanomirror, and has an axis of rotation 302 parallel to light beam 301. Light beam 301 is reflected by galvanomirror 303 and thus travels in the direction of linear access movement to first reflecting mirror 304. Light beam 301 is then redirected by first reflecting mirror 304 to objective lens 305 which focuses light beam 301 onto an optical storage medium. First and second reflecting mirror 304 and 303 are positioned so as to be at right angles to one another and the polarizing phase shift created by second mirror 303 is effectively cancelled out by the polarizing phase shift of first mirror 304.

In the embodiment here, the angle of incidence of beam 301 on objective lens 305, indicated by the curved arrow 305A, can be changed by very slight rotation of second reflecting mirror 303 along its axis of rotation 302, as indicated by arrow 302A, whereby the focused spot at the optical storage medium can be slightly moved in a direction at right angles to the track surface of the medium, as indicated by arrow 305B.

First and second reflecting mirrors 303 and 304 comprise total reflection prisms so that the phase differences occurring in the polarized light at each reflecting surface is cancelled. In particular, some angular displacement occurs in second reflecting mirror 303 so that the phase differences may not be totally cancelled. However, the galvanoangular displacement is only about ±0.5 degree thereby resulting in a polarization phase difference of ±1 degree so that this amount is sufficiently small when compared to an allowable overall polarization phase difference of approximately ±10 degrees and, therefore, represents no problem.

EMBODIMENT 2

Figure 4:
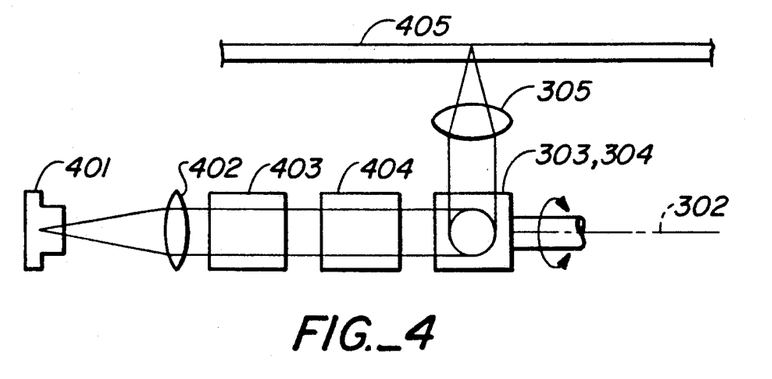
FIG. 4 and FIG. 5 are respectively a side elevation and a front or plan view of a second embodiment of an optical system of this invention.
Figure 5:
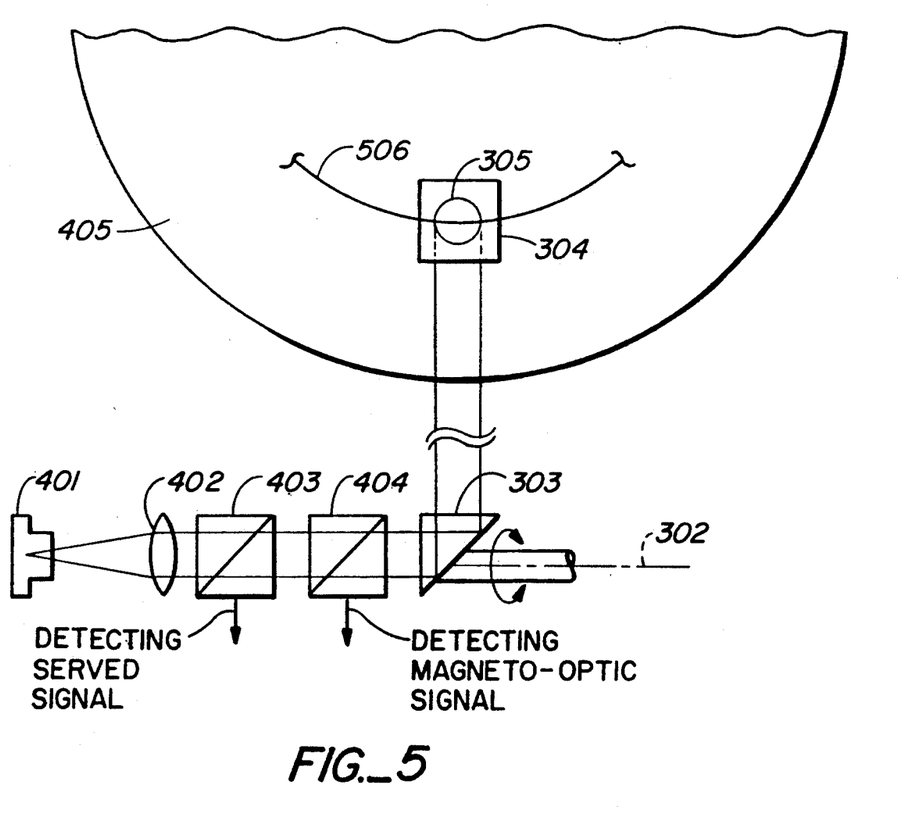

FIG. 4 and FIG. 5 are respectively a side elevation and a plan view of another optical system of this invention. The light beam from semiconductor laser 401 is collimated by objective lens 402 and thereafter passes through servo signal separation prism 403 and magneto-optic signal separation prism 404. The light path is then redirected in a direction substantially parallel to the direction of linear access movement by second reflecting mirror 303 which is galvanomirror and has a rotational axis 302 parallel with the optical axis of the light beam. The light is then further redirected to objective lens 305 by first reflecting mirror 304 and focused onto optical storage medium 405. Here, galvanomirror rotates through a very small angle about axis of rotation 302 so the light spot moves in a direction at right angles to track 506 on optical storage medium 405.

Figure 6:
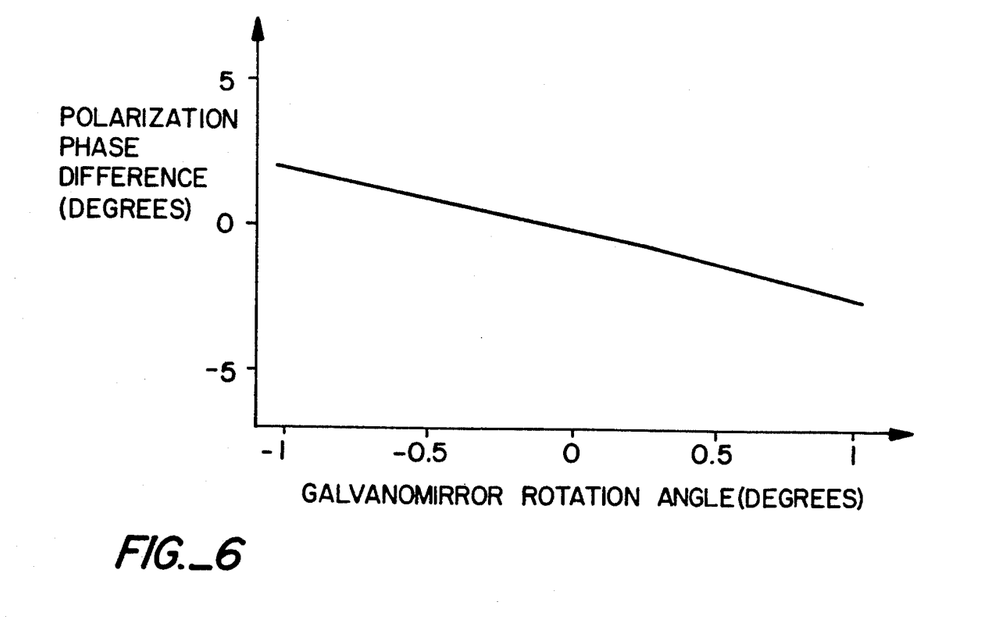
FIG. 6 is a graphic illustration showing the relationship between the rotation angle of the galvanomirror and the polarized light phase difference in the second embodiment of FIGS. 4 and 5.

FIG. 6 shows the amount of polarization phase shift that occurs relative to the galvanomirror angle of rotation when BK7 total reflection prisms are employed for first reflecting mirror 304 and second reflecting mirror 303. As indicated in FIG. 6, a zero polarization phase difference remaining substantially close to zero degree is achieved with an angle of rotation of first reflecting mirror 303 within ±1 degree.

Embodiment 3

Figure 7A:
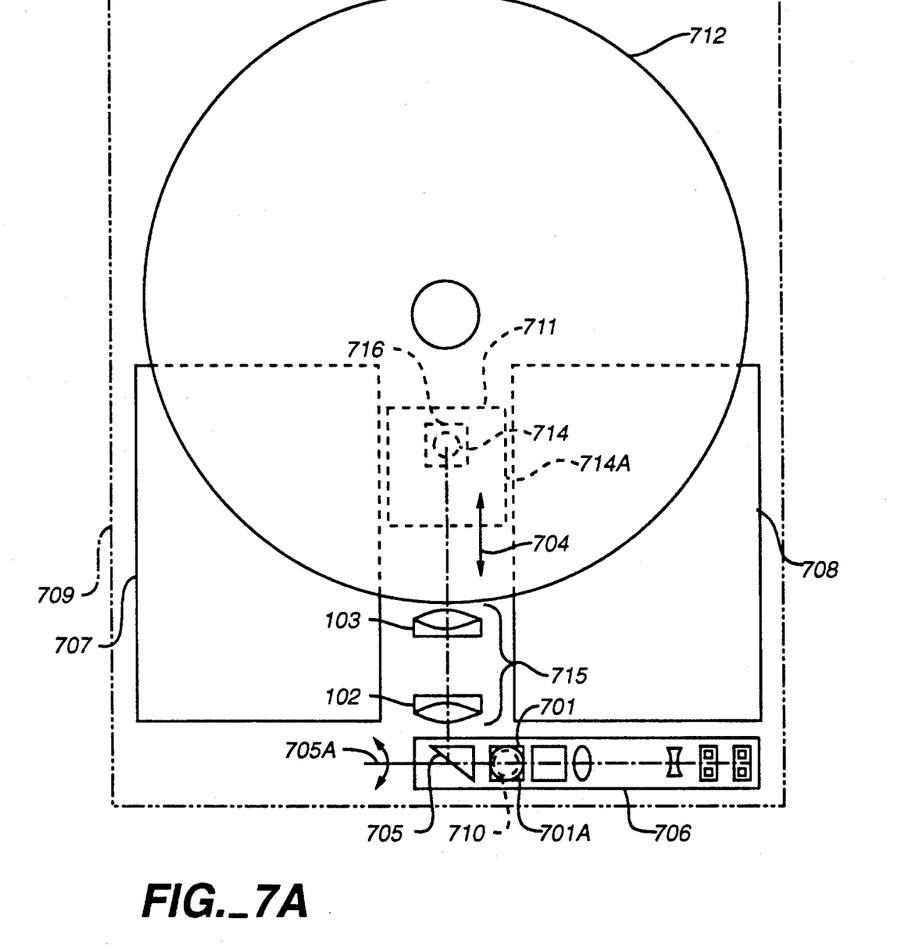
FIGS. 7A and 7B are respectively a plan view and a side elevation of a third embodiment of an optical system employed in an optical memory device of this invention.
Figure 7B:
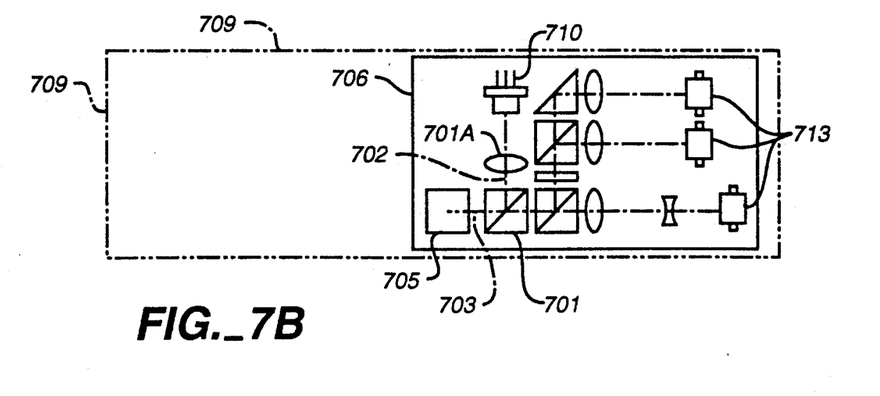

FIGS. 7A and 7B illustrate a third embodiment of an optical system of this invention wherein FIG. 7A is a plan view and FIG. 7B is a side elevation as applied, for example, to a 5.25-inch magneto-optic disc drive memory device, although this invention may easily be applied to the 3.5-inch optical, half-height size disc drive memory systems. The light beam from semiconductor laser 710, functioning as the point light source, is collimated by objective lens 701A and directed into beam splitter 701 wherein the light beam is redirected to second reflecting mirror 705. Reflecting mirror 705 redirects the light beam in the direction of linear access movement 704 whereby the beam is transmitted via afocal optical system 715 of this invention to objective lens 714 via first reflecting mirror 716 so that the light beam is focused as a spot onto optical storage medium 712. Reflecting mirror 705 is a galvanomirror for rotating mirror 705 about axis 705A to perform the tracking function as in the case of previous embodiments. The movable optical system 711 includes reflecting mirror 716 and objective lens 714 supported by a focusing actuator 714A. The light reflected from optical storage medium 712 returns via the same light path via mirrors 716 and 705 to beam splitter 701 and passes through beam splitter 701 and is directed into signal detection optical system 713 as is known in the art.

By making both the plane containing optical axis 702 of incident light and the optical axis of reflected light 703 relative to beam splitter 701 at right angles to the direction 704 of linear access of movable optical system 704 and by changing the light path in the direction 704 of linear access 704 via reflecting surface 705, stationary optical system 706 can be expanded in three dimensions whereas in the prior art optical system such as shown in FIG. 11, expansion of the optics could only be accomplished in two dimensional directions. In other words, by expanding stationary optical system 706 in a vertical direction, as illustrated in FIG. 7B, wherein stationary system components 701, 701A, 702 and 713 are mounted in a vertical plane within the standardized size for housing 709 at the rear of the optical memory device, the horizontal length of housing 709 can be significantly reduced to the standardized size for housing 709, as indicated in FIG. 7A, compared in FIG. 11A which is the same standardized size relative to housing 709. Also, the additional vertical height increases the room for operation of linear motors 707 and 708 resulting in an optical memory device configuration capable of high speed access realized within an standardized size for housing 709.

EMBODIMENT 4

Figure 8A:
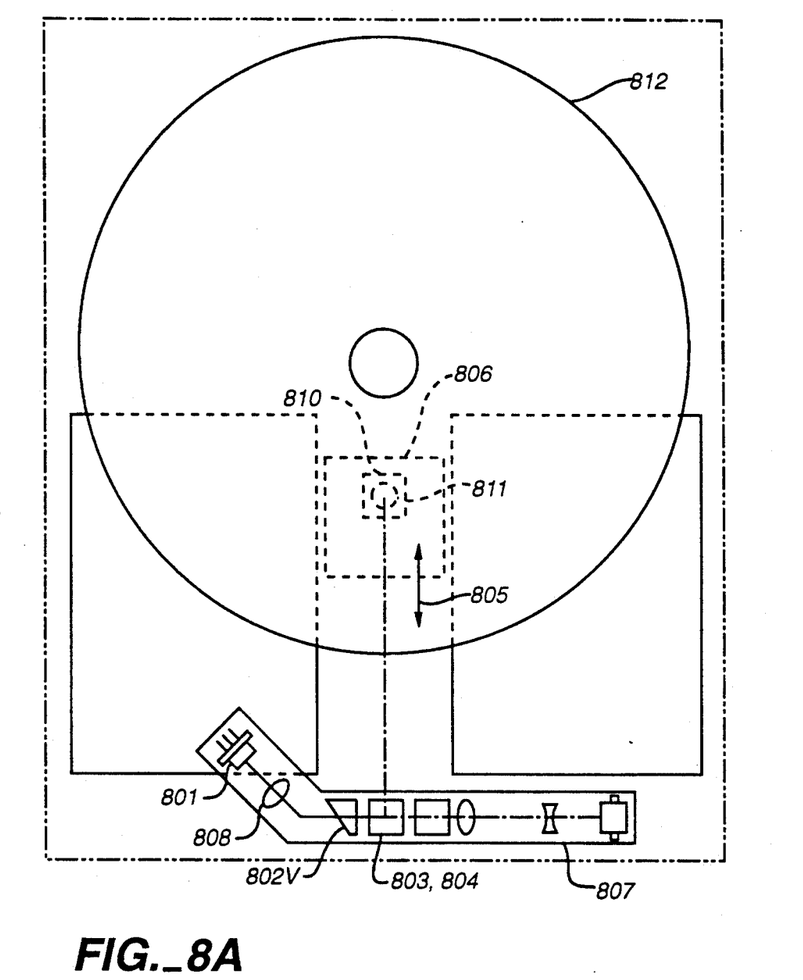
FIGS. 8A and 8B are respectively a plan view and a side elevation of fourth embodiment of an optical system employed in an optical memory device of this invention.
Figure 8B:
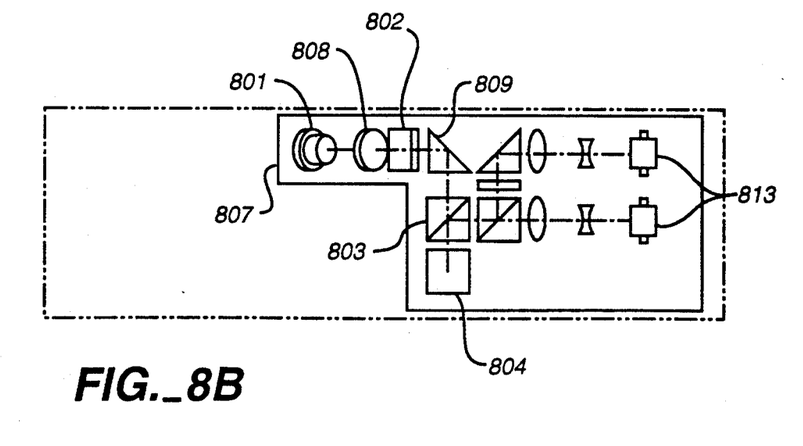

FIGS. 8A and 8B illustrate a fourth embodiment of an optical system of this invention wherein FIG. 8A is a plan view and FIG. 8B is a side elevation. The light beam from semiconductor laser 801 is collimated by means lens 808 and is directed through achromatic beam forming prism 802 after which the light beam is redirected by prism 809 through beam splitter 803 to beam splitter 804. Beam splitter 804 redirects the path of the light beam to be parallel with direction 805 of linear access movement by means of beam splitter 804. Movable optical system 806 contains a two dimensional lens actuator as known in the art for performing both focusing and tracking functions and includes reflecting prism 810 and objective lens 811 to focus the light beam to a spot on optical storage medium 812. The return beam travels to beam splitter 804 where the beam is redirected to beam splitter 803 and thereafter is directed into signal detection optical system 813 as is known in the art.

The fourth embodiment is, thus, similar to the third embodiment in providing for a compact size in the horizontal plane of the optical memory device by vertical mounting of the rear stationary optics and, further, provides for achromatic prism 802 to accommodate for fluctuations in the operating wavelength of semiconductor laser light source 801.

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope of the appended claims.

What is claimed is:

1. An optical system for an optical storage medium having a light source for producing a light beam, an afocal optical system, an objective lens and a reflection device, said reflection device having a deflecting mechanism for changing the propagating angle of said light beam through the optical system so as to enable a light spot focused from said light beam to follow a change in position of a track on said optical storage medium, the improvement comprising the positioning of said afocal optical system in the light path between said objective lens and said deflecting mechanism wherein said deflection mechanism is located before said afocal optical system and said objective lens is located after said afocal optical system to enable said afocal optical system to correct for displacement of said light beam due to the mechanics of said deflection mechanism, said afocal optical system comprising a first optical system having a positive focal length to receive the light beam from said deflecting mechanism and a second optical system with a positive focal length to transmit the light beam to said objective lens.

2. The optical system of claim 1 wherein the focal length of said first optical system is longer than the focal length of said second optical system.

3. The optical system of claim 1 wherein the focal length of said first optical system is substantially equal to the focal length of said second optical system.

4. An optical system comprising a point light source, a collimating lens for said light source, an objective lens, a focusing actuator for moving said objective lens for focusing said light beam onto an optical storage medium having an optical track on its surface, a first reflecting mirror which redirects the light beam in said system to said objective lens, a second reflecting mirror functioning also as galvanomirror to rotate said second reflecting mirror about an axis that is parallel with the axis of the light beam directed from said light source and incident on said second reflecting mirror and redirecting said light beam to said first reflecting mirror, said first and second mirrors comprising identical reflecting surfaces having their major axis formed at right angles relative to each other so that phase retardation occurring to polarized light in the light beam at the respective reflecting surfaces substantially cancel one another, an access mechanism for moving said objective lens laterally relative to said optical track in an access direction, said first reflecting mirror and said focusing actuator linearly movable in a direction at right angles to the track of said optical storage medium, said axis of rotation of said second reflecting mirror also at right angles to the access direction of said access mechanism.

5. The optical system of claim 4 wherein said first and second reflecting mirrors comprise total reflection prisms and said second reflecting mirror functions as a galvanomirror.

6. An optical system for an optical memory device having an optical storage medium with a sectionalized optical system comprising a stationary optical system including a light source for providing a light beam and a detection system for receiving a returning light beam and a movable optical system having a direction of linear access for moving an image of said light source laterally relative to said optical storage medium surface, said movable optical system including an objective lens for focusing said light beam to the surface of said optical storage medium, said stationary optical system having at least one beam splitter positioned in the path of said light beam between said light source and said movable optical system to redirect a return light beam from said optical storage medium surface from said movable optical system into a signal detection optical system in said stationary optical system, said beam splitter having a reflecting surface and arranged such that said direction of linear access of said movable optical system is at right angles to a plane containing both of the optical axes of said light beam from said light source and incident on said beam splitter reflecting surface and said returning light beam as reflected by said beam splitter reflecting surface after being received from said movable optical system, and a first reflection surface in said stationary optical system and provided between said beam splitter and said movable optical system to redirect said light beam from said beam splitter in the direction of said linear access and a second reflection surface in said movable optical system to redirect said light beam in a direction perpendicular to the direction of said linear access, means to rotate said first reflection surface about an axis that is parallel with the axis of the light beam from said light source and incident on said firt reflection surface, said first and second reflecting surfaces of substantially identical optical and physical properties and having their major axis formed at right angles relative to each other so that phase retardation occurring to polarized light in the light beam at the respective reflecting surfaces substantially cancel one another.

7. An optical system for an optical memory device including an optical medium having a plurality of optical components in axial alignment relative to an optical axis of said optical system and comprising a point light source providing a light beam, a collimating lens for collimating said light beam from said light source, said optical medium having an access area thereacross optically accessible by said optical system, an objective lens for focusing said light beam onto an access region on said optical medium access area, means for changing the angle of incidence of the light beam to said objective lens, an afocal optical system to compensate for lateral light beam displacement due to optical component movement in said optical system, said afocal optical system comprising first and second optical systems wherein when said light beam has been inclined with respect to said optical axis via said incidence angle changing means, said light beam is reimaged therebetween in nonalignment relation relative to said optical axis, the distance between said second optical system and said objective lens determined in a manner that the center of said light beam crosses said optical axis substantially at the center position of said objective lens when said objective lens is positioned to focus the center of said access region of said optical memory medium while said light beam has been inclined with respect to said optical axis by said incidence angle changing means.

8. The optical system of claim 7 wherein the focal length of said first optical system is longer than the focal length of said second optical system.

9. The optical system of claim 7 wherein the focal length of said first optical system is substantially equal to the focal length of said second optical system.

10. An optical system for an optical memory device including an optical storage medium having a track for recording information comprising:

a light source for producing a light beam along a light path, deflection means in said light path for changing the angle of incidence of said light beam onto said optical storage medium track to follow a change in track position within a seek area on said medium, an afocal optical system positioned in said light path to follow said deflection means and composed of a first optical system having a positive focal length and adapted to receive a light beam from said deflection means and a second optical system having a positive focal length and adapted for transmitting said light beam to said objective lens, said first and second optical systems aligned on said optical axis, an objective lens positioned in said light path to follow said afocal optical system said deflection mechanism located before said afocal optical system to enable said afocal optical system to correct for displacement of said light beam due to the mechanics of said deflection mechanism, said first and second optical systems being spaced from each other by a distance which is substantially equal to the sum of the focal length of said first and second optical systems, said objective lens movable within a predetermined distance relative to said afocal optical system along said optical axis wherein the center point of said distance is determined such that an angle of incidence of said light beam on said objective lens will cross said optical axis substantially central of said objective lens when said light beam is focused substantially at the center of said seek area.

11. An optical system having an objective lens and a reflection device having a deflecting mechanism for changing the angle of a light beam incident on said objective lens so as to enable a light spot focused from said light beam to follow a change in position of a track on an optical storage medium and an afocal optical system located in the light path between said objective lens and said deflecting mechanism comprising a first optical system having a positive focal length to receive the light beam from said deflecting mechanism and a second optical system with a positive focal length to transmit the light beam to said objective lens and the focal length of said first optical system is made longer than the focal length of said second optical system having a convergence ratio of approximately 1.12 so that the angle of light beam incident change necessary by said deflection mechanism is reduced by about 11%.

12. The optical system of claim 10 wherein the focal length of said first optical system is longer than the focal length of said second optical system.

* * * * *